United States Patent
Ju et al.

(10) Patent No.: US 11,030,594 B2
(45) Date of Patent: Jun. 8, 2021

(54) NETWORK SERVER AND METHOD OF OPERATING THEREOF TO MEDIATE ACTIONS BETWEEN USER TERMINALS RELATING TO ONLINE GAMES

(71) Applicant: NHN Entertainment Corporation, Seongnam-si (KR)

(72) Inventors: Cheolmin Ju, Seongnam-si (KR); Yuik Yim, Seongnam-si (KR)

(73) Assignee: NHN Entertainment Corporation, Seongnam-si (KR)

( * ) Notice: Subject to any disclaimer, the term of this patent is extended or adjusted under 35 U.S.C. 154(b) by 401 days.

(21) Appl. No.: 15/970,765

(22) Filed: May 3, 2018

(65) Prior Publication Data
US 2019/0213566 A1 Jul. 11, 2019

(30) Foreign Application Priority Data

Jan. 8, 2018 (KR) .......................... 10-2018-0002285

(51) Int. Cl.
*G06Q 30/00* (2012.01)
*G06Q 20/12* (2012.01)
(Continued)

(52) U.S. Cl.
CPC ......... *G06Q 20/1235* (2013.01); *A63F 13/77* (2014.09); *A63F 13/792* (2014.09);
(Continued)

(58) Field of Classification Search
CPC ..................................................... G06Q 30/00
See application file for complete search history.

(56) References Cited

U.S. PATENT DOCUMENTS 6,591,250 B1 * 7/2003 Johnson ................. G06Q 30/06
705/51
7,373,400 B2 5/2008 Vesikivi et al.
(Continued)

FOREIGN PATENT DOCUMENTS

JP 2016-064137 4/2016
KR 10-2007-0003939 1/2007
(Continued)

OTHER PUBLICATIONS

Dmarket1, Dotson, Kyt, Dmarket looks to blockchain for cross-game virtual item marketplace, dated Aug. 3, 2017. (Year: 2017).*
(Continued)

*Primary Examiner* — Mark A Fadok
(74) *Attorney, Agent, or Firm* — H.C. Park & Associates, PLC (57) ABSTRACT

A network server includes a communicator and at least one processor coupled to the communicator. The at least processing is configured to: receive a first data signal from a first user terminal that is shared with a game server; transfer to the game server a first request, together with the first data signal, to verify validation of a game item when a first message including information relating to the game item is received from the first user terminal; receive from the second user terminal a second message relating to the game item; and transfer to the game server a second request, together with the first data signal, to change an owner of the game item from a first game ID associated with the first user terminal to a second game ID associated to the second user terminal in response to determining whether second message is authorized.

20 Claims, 8 Drawing Sheets

(51) Int. Cl.
  *G06Q 20/06* (2012.01)
  *G06Q 30/06* (2012.01)
  *A63F 13/85* (2014.01)
  *A63F 13/77* (2014.01)
  *A63F 13/792* (2014.01)

(52) U.S. Cl.
  CPC ......... *A63F 13/85* (2014.09); *G06Q 20/0655* (2013.01); *G06Q 30/0641* (2013.01)

(56) References Cited

U.S. PATENT DOCUMENTS

| | | | | |
|---|---|---|---|---|
| 2002/0073043 | A1* | 6/2002 | Herman | G06Q 30/06 705/64 |
| 2005/0240938 | A1* | 10/2005 | Lane | H04L 67/02 719/310 |
| 2006/0234795 | A1* | 10/2006 | Dhunjishaw | G06Q 30/08 463/42 |
| 2010/0222139 | A1* | 9/2010 | Wang | G06Q 30/08 463/29 |
| 2011/0276477 | A1* | 11/2011 | Shuster | G06Q 30/08 705/39 |
| 2012/0110603 | A1* | 5/2012 | Kaneko | G06F 9/547 719/328 |
| 2012/0317034 | A1* | 12/2012 | Guha | G07F 17/3251 705/65 |
| 2016/0016080 | A1* | 1/2016 | Jalili | A63F 13/73 463/16 |
| 2016/0151715 | A1 | 6/2016 | Polansky et al. | |
| 2016/0175707 | A1* | 6/2016 | Liang | A63F 13/77 463/29 |
| 2017/0136360 | A1* | 5/2017 | Smith | A63F 13/00 |

FOREIGN PATENT DOCUMENTS

| | | |
|---|---|---|
| KR | 10-2013-0137881 | 12/2013 |
| KR | 10-2014-0124430 | 10/2014 |
| KR | 10-2016-0065712 | 6/2016 |

OTHER PUBLICATIONS

Dmarket2, Dmarket—The in-game marketplace powered by blockchain, Chipin, ICO News, dated Oct. 23, 2017, (Year: 2017).*
Dmarket3, Higgins, Stan, $10.4 million in game item exchange Dmarket raised in funds in ICO, Coindesk, dated Aug. 21, 2017. (Year: 2017).*
Wax, Why is trading in-game digital items so complex, WAX IO, dated Dec. 11, 2017. (Year: 2017).*
Office Action dated Mar. 2, 2020, issued in Korean Patent Application No. 2018-0002285.
Tstory Blog, SSO Delegation and Propagation, Mar. 30, 2009, available at <URL: https://mercurii.tistory.com/227>.
Korean Office Action dated Jan. 22, 2019, issued in Korean Patent Application No. 10-2018-0002285—with unverified machine translation.

* cited by examiner

NETWORK SERVER AND METHOD OF OPERATING THEREOF TO MEDIATE ACTIONS BETWEEN USER TERMINALS RELATING TO ONLINE GAMES

CROSS REFERENCE TO RELATED APPLICATION

This application claims priority from and the benefit of Korean Patent Application No. 10-2018-0002285, filed on Jan. 8, 2018, which is hereby incorporated by reference for all purposes as if fully set forth herein.

BACKGROUND

Field

Exemplary implementations of the invention relate generally to online gaming and, more specifically, to a network server and a method of operating thereof to mediate actions between user terminals relating to online games.

Discussion of the Background

Recently, due to the development of data communication networks, many people use the Internet, and various types of services using the Internet such as messenger, shopping mall, and online electronic games are increasing popular due to the increase of Internet usage. Among the various Internet services, especially in the field of game services, many game users use various online game services provided through the Internet. The game services are being developed in the form of online games that allow the game users to access game servers through the Internet including the mobile communication network.

The game service provides various types of game items, such as virtual characters, properties of such characters, e.g., power levels or tools/accessories for attacking opponents or shielding against attacks, as one example, to the game users to increase the interest in the game services. The game service may provide the game items to the game users free or for a fee, or based upon other non-monetary criteria such as success in game play, hours played, etc. The game users may access the game server of the game service to obtain the game items themselves. Accordingly, there is a need to mediate exchange e of game item for the convenience of the game users who access the game server to obtain and/or trade game item.

The above information disclosed in this Background section is only for understanding of the background of the inventive concepts, and, therefore, it may contain information that does not constitute prior art.

SUMMARY

Devices constructed according to exemplary implementations of the invention and methods thereof are capable of mediating game item exchanges between users to provide technological benefits, including reducing network traffic and using network resources efficiently when user terminals access game servers to obtain or trade a game item between themselves, as well as to improve the convenience of gameplay.

According to the principles and exemplary implementations of the invention, the reliability of game item transfer requests may be improved, and the item mediation server may perform the transfers more efficiently. For example, the number of communications between the game server, the user terminals, and the item mediation server, and/or other required components to ensure the reliability of the transfer requests may be reduced, thereby reducing the network traffic and resources required for the exchange of game items.

Additional features of the inventive concepts will be set forth in the description which follows, and in part will be apparent from the description, or may be learned by practice of the inventive concepts.

According to one or more embodiments of the invention, a network server to mediate actions relating to online games between user terminals includes a communicator and at least one processor coupled to the communicator to receive data from and transfer data to an online gaming network. The at least processor is configured to: receive a first data signal from a first user terminal that is shared with a game server; transfer to the game server a first request, together with the first data signal, to verify validation of a game item when a first message including information relating to the game item is received from the first user terminal; update a list of game items to include the game item information based on feedback from the first request received from the game server and provide access to the list of game items to a second user terminal; receive from the second user terminal a second message relating to the game item; determine whether the second message is authorized; and transfer to the game server a second request, together with the first data signal, to change an owner of the game item from a first game ID associated with the first user terminal to a second game ID associated to the second user terminal in response to determining whether second message is authorized.

The first data signal may include authentication data determined by communication between the first user terminal and the game server.

The first request may include the first game ID and information related to or representative of the game item; and the processor may be further configured to receive the first game ID from the first user terminal and to update the list of the game items in response to the feedback from the first request indicating that the game item belongs to the first game ID.

The first message may further include information representative of a selected amount of digital currency; and the processor may be further configured to update the list of game items to include the digital currency information based on the feedback from the first request.

The processor may be further configured to determine whether the second message is authorized by accessing a database to determine whether at least the selected amount of digital currency belongs to a first user ID associated with the second user terminal.

The processor may be further configured to update a database to withdraw the selected amount of digital currency from the first user ID, and to transfer the selected amount to a second user ID associated with the first user terminal, in response to feedback from the second request received from the game server indicating completion of the change of the owner.

The processor may be further configured to receive the second game ID from the second user terminal and to determine whether the second message is authorized by transferring to the game server a third request to verify whether the second game ID is valid.

The processor may be further configured to receive a second data signal from the second user terminal that is shared with the game server and to transfer the second data signal together with the third request to enable the game server to verify whether the second game ID is valid.

The processor may be further configured to receive a second data signal from the second user terminal that is shared with the game server and to transfer the second data signal together with the second request and the first data signal.

According to one or more embodiments of the invention, a method of operating a network server to mediate actions between user terminals relating to online games includes steps of: receiving a first data signal from a first user terminal, the first data signal being shared with a game server; transferring to the game server a first request, together with the first data signal, to verify validation of a game item associated with the game server when a first message including information relating to the game item is received from the first user terminal; updating a list of game items to include the game item information based on feedback from the first request received from the game server; providing access to the updated list of game items to a second user terminal; receiving from the second user terminal a second message relating to the game item; determining whether the second message is authorized; and transferring to the game server a second request together with the first data signal to change an owner of the game item from a first game ID associated with the first user terminal to a second game ID associated with the second user terminal in response to determining whether the second message is authorized.

The first data signal may include authentication data determined by communication between the first user terminal and the game server.

The method may further include the step of receiving the first game ID from the first user terminal. The first request may include the first game ID and the game item information, and the step of updating the list of game items may include updating the list of game items in response to the feedback from the first request indicating that the game item belongs to the first game ID.

The first message may further include a selected amount of digital currency; and the step of updating the list of game items may include updating the list of game items to further include the selected amount of digital currency based on the feedback from the first request.

The step of determining whether the second message is authorized may include accessing a database to determine whether at least the selected amount of digital currency belongs to a first user ID associated to the second user terminal.

The method may further include updating a database to withdraw at least the selected amount of digital currency from the first user ID, and to transfer the selected amount of digital currency to a second user ID associated to the first user terminal, in response to feedback from the second request received from the game server indicating completion of the change of the owner.

The method may further include receiving the second game ID from the second user terminal. The step of the determining whether the second message is authorized may include transferring to the game server a third request to verify whether the second game ID is valid.

The method may further include a step of receiving a second data signal from the second user terminal, the second data signal being shared with the game server. The step of transferring the third request may include transferring the second data signal together with the third request to enable the game server to verify whether the second game ID is valid.

The method may further include the step of receiving a second data signal from the second user terminal, the second data signal being shared with the game server. The step of transferring the second request may include transferring the second data signal together with the second request and the first data signal.

The method may further include steps of: informing the first user terminal that the request in the first message is authorized when the list of game items is updated; and informing the first user terminal that the request in the first message is not authorized when the game item is invalid.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

In the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element is referred to as being "on," "connected to," or "coupled to" another element, it may be directly on, connected to, or coupled to the other element or intervening elements may be present. When, however, an element is referred to as being "directly on," "directly connected to," or "directly coupled to" another element, there are no intervening elements present. To this end, the term "connected" may refer to physical, electrical, and/or fluid connection, with or without intervening elements. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

In exemplary embodiments, a server, and/or one or more components thereof, may be implemented via one or more general purpose and/or special purpose components, such as one or more discrete circuits, digital signal processing chips, integrated circuits, application specific integrated circuits, microprocessors, processors, programmable arrays, field programmable arrays, instruction set processors, and/or the like.

According to one or more exemplary embodiments, the features, functions, processes, etc., described herein may be implemented via software, hardware (e.g., general processor, digital signal processing (DSP) chip, an application specific integrated circuit (ASIC), field programmable gate arrays (FPGAs), etc.), firmware, or a combination thereof. In this manner, a server, and/or one or more components thereof may include or otherwise be associated with one or more memories (not shown) including code (e.g., instructions) configured to cause a server, and/or one or more components thereof to perform one or more of the features, functions, processes, etc., described herein.

The memories may be any medium that participates in providing code to the one or more software, hardware, and/or firmware components for execution. Such memories may be implemented in any suitable form, including, but not limited to, non-volatile media, volatile media, and transmission media. Non-volatile media include, for example, optical or magnetic disks. Volatile media include dynamic memory. Transmission media include coaxial cables, copper wire and fiber optics. Transmission media can also take the form of acoustic, optical, or electromagnetic waves. Common forms of computer-readable media include, for example, a floppy disk, a flexible disk, hard disk, magnetic tape, any other magnetic medium, a compact disk-read only memory (CD-ROM), a rewriteable compact disk (CD-RW), a digital video disk (DVD), a rewriteable DVD (DVD-RW), any other optical medium, punch cards, paper tape, optical mark sheets, any other physical medium with patterns of holes or other optically recognizable indicia, a random-access memory (RAM), a programmable read only memory (PROM), and erasable programmable read only memory (EPROM), a FLASH-EPROM, any other memory chip or cartridge, a carrier wave, or any other medium from which information may be read by, for example, a controller/processor.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 1:
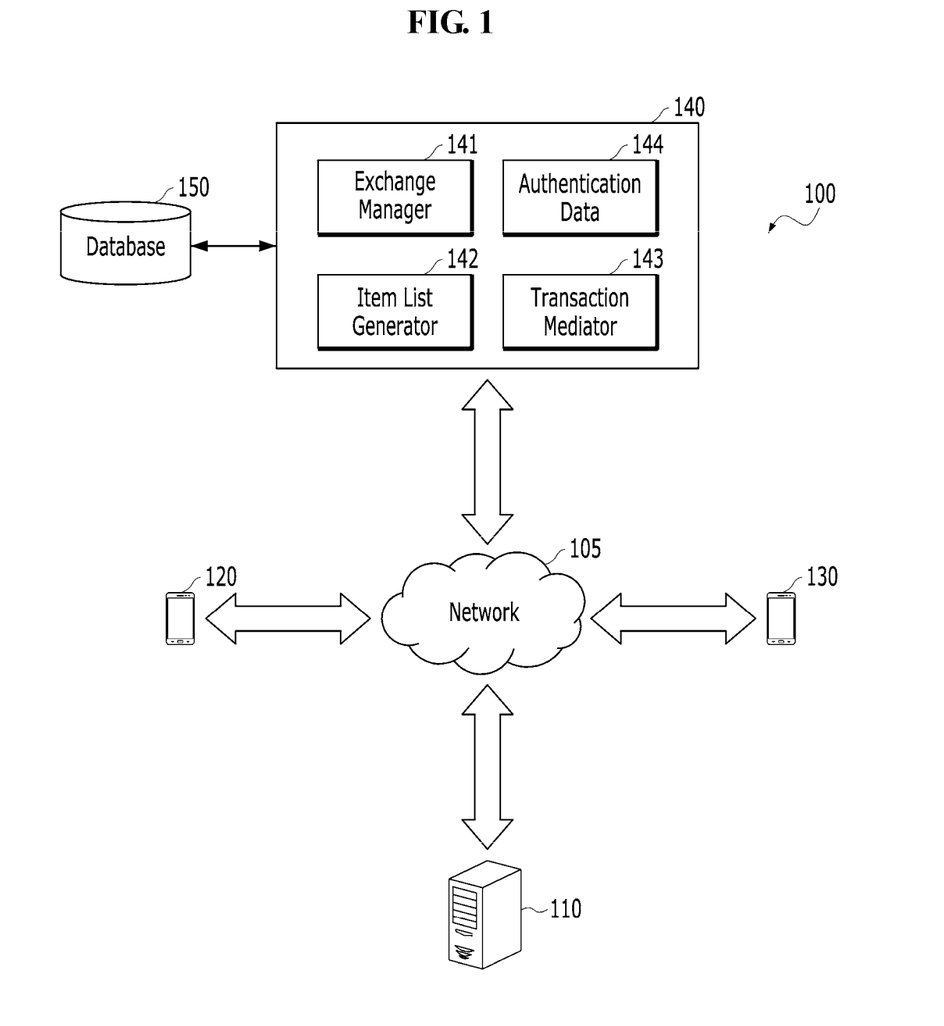
FIG. 1 is a block diagram of a network system constructed according to an exemplary embodiment of the invention for mediating exchange of game items between first and second user terminals.
Figure 2:
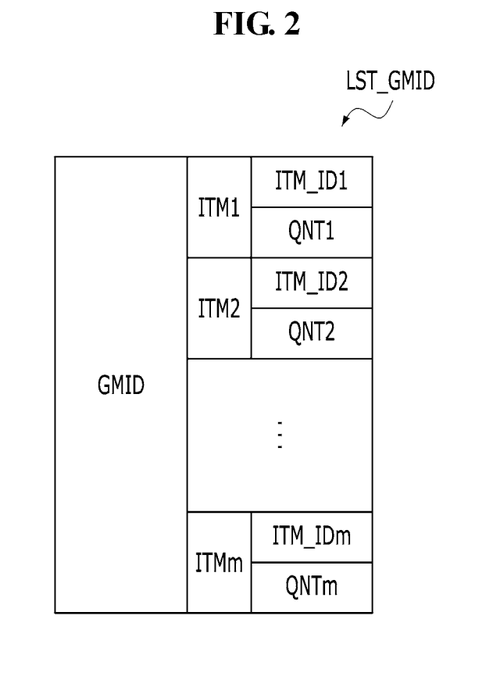
FIG. 2 is a conceptual diagram illustrating organization of game items of a game user ID managed by a game server according to one embodiment of the invention.
Figure 3:
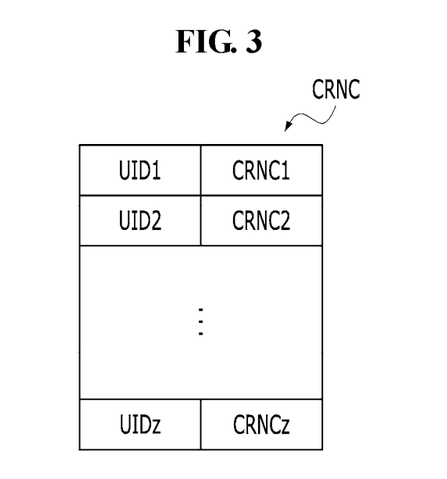
FIG. 3 is a conceptual diagram illustrating organization of credit values, such as digital currency or game play credits, by individual user IDs managed by a game item mediation server according to one embodiment of the invention.

FIG. 1 is a block diagram of a network system constructed according to an exemplary embodiment of the invention for mediating exchange of game items between first and second user terminals. FIG. 2 is a conceptual diagram illustrating organization of game items of a game user ID managed by a game server according to one embodiment of the invention. FIG. 3 is a conceptual diagram illustrating organization of credit values, such as digital currency or game play credits, according to individual user IDs managed by a game item mediation server according to one embodiment of the invention.

Referring to FIG. 1, the network system 100 includes a network 105, a game server 110, a first user terminal 120, a second user terminal 130, and an item mediation server 140. The network system 100 may include or implement a plurality of devices, servers, and/or software components that operate to perform various methodologies according to the described principles and exemplary embodiments of the invention. It can be appreciated that the devices and/or servers illustrated in FIG. 1 may be deployed in other ways and that the operations and services provided by the devices and/or servers may be combined or separated for the described exemplary embodiments and may be performed by a greater number or fewer number of devices and/or servers. One or more devices and/or servers may be operated and/or maintained by the same or different entities.

The network 105 couples the devices and servers in the network system 100, such as the game server 110, the first and second user terminals 120 and 130, and the item mediation server 140. The network 105 may be at least one of public network, such as the Internet, one or more private networks, wire networks, wireless networks, other appropriate types of networks, and combinations thereof that may be accessible by the game server 110, the first and second user terminals 120 and 130, and the item mediation server 140. The game server 110, the first and second user terminals 120 and 130, and the item mediation server 140 may have at least one of wire communication capabilities and wireless communication capabilities and may communicate each other through the network 105.

The game server 110 communicates with user terminals in the network system 100, such as the first and second user terminals 120 and 130, to provide an online game service. The first user terminal 120 and the second user terminal 130 may register a first game ID (Identification) associated with a first user and a second game ID associated with a second user on the game service, respectively, and then may carry out actions required by the game service as the first and second users play the game through the first game ID and the second game ID, respectively. Of course, one user may have multiple game IDs.

The game server 110 may provide various game items used in the game service, such as virtual characters, emojis, properties of the virtual characters, items used by or with the virtual characters, power levels, credits, items provided to make the game progress favorably, etc. The game server 110 may store and manage information related to or representative of game items for each game ID so that the game ID may utilize the game items while playing the game service. Referring to FIG. 2, the game items ITM1 to ITMm for each game ID GMID are shown as being listed in an item list LST_GMID, where m is a positive integer. Each game item may be defined by an item ID for identifying the game item, and by a quantity of the game item, etc. In FIG. 2, a first game item ITM1 includes a first item ID ITM_ID1 and a first quantity QNT1, a second game item ITM2 includes a second item ID ITM_ID2 and a second quantity QNT2, and an m-th game item ITMm includes an m-th item ID ITM_IDm and an m-th quantity QNTm. Of course, other ways of organizing and storing game items within computer memory are possible.

Referring back to FIG. 1, each of the first and second user terminals 120 and 130 may receive information related to or representative of the game items that the game ID has, and may display the game items to enable the user to recognize them. Also, each of the first and second user terminals 120 and 130 may receive at least part of an open item list from the item mediation server 140, and may display the open item list to enable the user to recognize the game items. Each of the first and second user terminals 120 and 130 may include one or more processors, memories, and other appropriate components for executing computer programs including instructions stored on one or more computer readable mediums to implement applications to access and utilize the game service of the game server 110 and the item mediation service of the item mediation server 140.

In an exemplary embodiment, the first and second user terminals 130 and 140 may employ devices suitable for communicating information through wire communications and/or wireless communications and for processing the information, such as a personal computer (PC), an Ultra Mobile PC, a workstation, a net-book, a Personal Digital Assistant (PDA), a portable computer, a web tablet, a wireless phone, a mobile phone, a smart phone, an e-book, a Portable Multimedia Player (PMP), a game console, and a portable game console, or the like.

The item mediation server 140 communicates with the game server 110 and the first and second user terminals 120 and 130 to mediate actions relating to the game items, such as the exchange of game items between the first game ID and the second game ID, which are associated to the first and second user terminals 120 and 130, respectively. The first user terminal 120 and the second user terminal 130 register a first user ID and a second user ID on the item mediation service of the item mediation server 140, respectively, and then access the item mediation server 140 through the first user ID and the second user ID. Each of the first and second user terminals 120 and 130 may transfer to the item mediation server 140 a message including information related to or representative of the game item, while accessing the item mediation server 140. The message may request any type of action relating to a game item, such as a sale, purchase, or free exchange or use of the game item. The item mediation server 140 may process the requests in the messages transferred from the first and second user terminals 120 and 130 based on communications with the game server 110.

The item mediation server 140 may include a exchange manager 141, an item list generator 142, and a transaction mediator 143. The item mediation server 140 may include one or more processors, memories, and other appropriate components for executing one or more computer programs including instructions stored on one or more computer readable mediums to implement the exchange manager 141, the item list generator 142, and the transaction mediator 143.

The exchange manager 141 may manage any type or combination of credit, reward or debit systems associated with the user IDs, such as digital currency, through which the first user terminal 120 and the second user terminal 130 access the item mediation server 140. For illustrative purposes according to exemplary embodiments, the exchange information will be described herein as being in the form of digital currency, the value of which may be stored in a database 150 for each user ID. The database 150 may include at least one of a storage medium provided in the item mediation server 140 and a storage medium external to the item mediation server 140. In case where the database 150 includes the external storage medium, the exchange manager 141 may communicate with the database 150 through a wire communication and/or a wireless communication.

Referring to FIG. 3, an amount of digital currency for each user ID, which is stored in the database 150, is shown as being listed in a digital currency list CRNC. In FIG. 3, the first user ID UID1 has a first amount of digital currency CRNC1, the second user ID UID2 has a second amount of digital currency CRNC2, and the z-th user ID UIDz has a z-th amount of digital currency CRNCz, where z is a positive integer.

Referring back to FIG. 1, the exchange manager 141 may verify an amount of digital currency that each user ID has, and may change the amount of digital currency of each user ID in response to control signals or command from the item list generator 142, the transaction mediator 143, and the other appropriate elements in the network system 100. Of course, if another system, such as a credit system based upon game play or success points, etc. is used to facilitate exchanges of game items, the exchange manager verifies and may change the amount of credit used to exchange game items.

While the exchange manager 141 is shown as being included in the item mediation server 140, exemplary embodiments of the invention are not limited thereto. For example, the exchange manager 141 may be provided as a separate server which is able to communicate with the item mediation server 140. In this manner, the item list generator 142 and the transaction mediator 143 may transfer control signals or data to the exchange manager 141 through the network 105.

The item list generator 142 may generate and update an open game item list by communicating with the game server 110 and a user terminal transferring a message requesting a transfer of the game item. The open item list includes information related to or representative of the game item. In case where the message requests the transfer of the game item for the selected amount of digital currency, the open item list may further include a selected amount of digital currency. The item list generator 142 may provide user terminals in the network system 100 that access the item mediation server 140 with at least some of the information related to or representative of the game items included in the open item list. That is, the open item list is accessible by the user terminals in the network system 100. The open item list may be stored in the database 150.

The transaction mediator 143 may facilitate the exchange of the game items included in the open item list by communicating with the game server 110 and a user terminal transferring the message requesting one of the game items included in the open item list.

Hereinafter, for descriptive convenience, it is assumed that the first user terminal 120 transfers a message requesting the sale of the game item and the second user terminal 130 transfers a message requesting the purchase of the game item.

The item list generator 142 may transfer, to the game server 110, a first request to verify a validation of the game item when a message for a sale of the game item is received from the first user terminal 120. The message may include information related to or representative of the game item. The message may further include the selected amount of digital currency. To this end, the item list generator 142 updates the open item list to include information related to or representative of the game item and the selected amount of digital currency depending on the validation of the game item.

According to an exemplary embodiment of the invention, the item mediation server 140 stores a data signal provided from the first user terminal 120, the data signal being determined by communications between the game server 110 and the first user terminal 120 and shared between the game server 110 and the first user terminal 120. The item list generator 142 transfers the stored data signal together with the first request to the game server 110. The data signal may be authentication data 144 such as an authentication token, as shown in FIG. 1. The authentication data 144 may be determined based on information associated with a user terminal, such as an identifier (e.g. identification number) of the user terminal, an identifier of one of the applications installed on the user terminal such as an operating system (OS) or a game application, the game ID of the user terminal, the game item, or the combinations thereof. Hereinafter, it is assumed that the data signal is the authentication data 144 for descriptive convenience.

The item list generator 142 cannot transfer the authentication data 144 to the game server 110 unless the first user terminal 120 provides the authentication data 144 to the item mediation server 140 since the authentication data 144 is determined by the communication between the game server 110 and the first user terminal 120. Therefore, if authentication data 144 is transferred by the item mediation server 140 it means that the first request has been authorized based on an approval or selection of the first user terminal 120, and not by unknown sources. That is, the authentication data 144 may ensure the reliability of the first request being transferred together with the authentication data 144.

The game server 110 may verify the validation of the game item of the first request when the authentication data 144 is the one shared with the first user terminal 120. For example, the game server 110 verifies whether the game item of the first request is valid based on its database such as the item list LST_GMID shown in FIG. 2. For instance, the game item of the first request is valid when it is in the item list LST_GMID. To this end, the game server 110 may provide the item mediation server 110 with a feedback signal or data indicating the game item is valid or invalid.

The second user terminal 130 may transfer, to the item mediation server 140, a message requesting the purchase of the game item listed in the open item list. The transaction mediator 143 determines whether the message transferred from the second user terminal 130 is authorized. For example, the transaction mediator 143 transfers a control signal to the exchange manager 141 to access the database 150 to determine whether at least the selected amount of digital currency belongs to the second user ID. The transaction mediator 143 may determine that the message transferred from the second user terminal 130 is authorized when at least the selected amount of digital currency belongs to the second user ID.

The transaction mediator 143 transfers, to the game server 110, a second request to change an owner of the game item from the first game ID to second game ID in response to determining that the message transferred from the second user terminal 130 is authorized. In response to feedback indicating completion of the change of the owner, the transaction mediator 143 may control the exchange manager 141 to update the database 150 to withdraw the selected amount or more of digital currency from the second user ID and to transfer the selected amount or less of digital currency to the first user ID.

It is important for the game server 110 to verify whether the second request is caused or approved by the first user terminal 120 since the game item is to be withdrawn from the first game ID in response to the second request. The game server 110 should not change the owner of the game item if the second request is not caused or approved by the first user terminal 120 but caused by other resources, such as another user terminal in the network system 100.

According to an exemplary embodiment of the invention, the transaction mediator 143 transfers, to the game server 110, the authentication data 144 together with the second request to change the owner of the game item, the authentication data 144 being provided by the first user terminal 120. The authentication data 144 transferred together with the second request means that the second request is based on the approval or selection of the first user terminal 120, and not caused by unknown resources. That is, the authentication data 144 may ensure the reliability of the second request transferred together with the authentication data 144.

The game server 110 may change the owner of the game item from the first game ID to the second game ID when the authentication data 144 is the one shared with the first user terminal 120. For example, the game item is deleted from the item list LST_GMID of the first game ID, and the game item is added to the item list LST_GMID of the second game ID. To this end, the game server 110 may provide the item mediation server 140 with a feedback signal or data indicating completion of the change of the owner.

According to exemplary embodiments of the invention, the item mediation server 140 facilitates the exchange of the game item by communicating with the game server 110 instead of the user terminals 120 and 130. Accordingly, the network capacity and resources required when the user terminals 120 and 130 access the game server 110 to exchange the game item themselves may be reduced. Thus, overall networking performance of the network system 100 may also be improved. Furthermore, convenience of game users may further be improved since the item mediation server 140 mediates the game item exchange by using a system such as the digital currency. For example, a game user who sells a game item of a certain game service may purchase a game item of another game service as well as a game item of the certain game service by using the digital currency.

According to exemplary embodiments of the invention, the item mediation server 140 transfers the authentication data 144 to the game server 110 when transferring requests associated with game item exchanges. Accordingly, the reliability of the requests may be improved, and the item mediation server 140 may perform the exchanges more efficiently than in conventional systems. For example, the number of communications between the game server 110, the user terminals 120 and 130, the item mediation server 140, and other/or required components to ensure the reliability of the requests may be reduced, thereby reducing the network traffic and resources required for the exchange of the game items.

Figure 4:
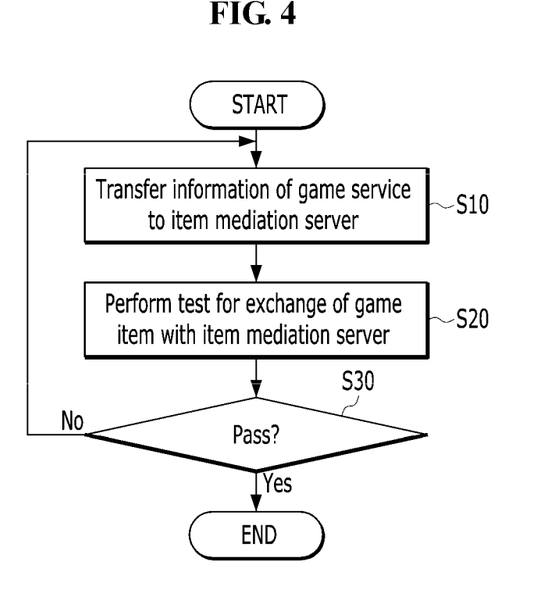
FIG. 4 is a flowchart of an exemplary embodiment of a method for operating a game server to prepare for exchanges of game items by communicating with the item mediation server.

FIG. 4 is a flowchart of an exemplary embodiment of a method for operating a game server to prepare for exchanges of game items by communicating with the item mediation server.

Referring to FIGS. 3 and 4, at step S10, information related to or representative of a particular game service is transferred to the item mediation server 140. The game server 110 may transfer various types information related to the game service, such as the name of game service (e.g., "echo of soul"), information related to or representative of game items (hereinafter "game item information"), information related to or representative of game items allowed to exchange, etc.

At step S20, a test for the exchanges of the game items is performed with the item mediation server 140. For example, when the game server 110 requests the test, the item mediation server 150 transfers a first request to verify the validation of the game item or a second request to change the owner of the game item together with a test authentication data. At step S30, step S10 to S20 may be performed repeatedly depending on whether the test is passed or failed. For example, the test may be passed when the request is transferred based on a required manner and has a determined data format.

Figure 5:
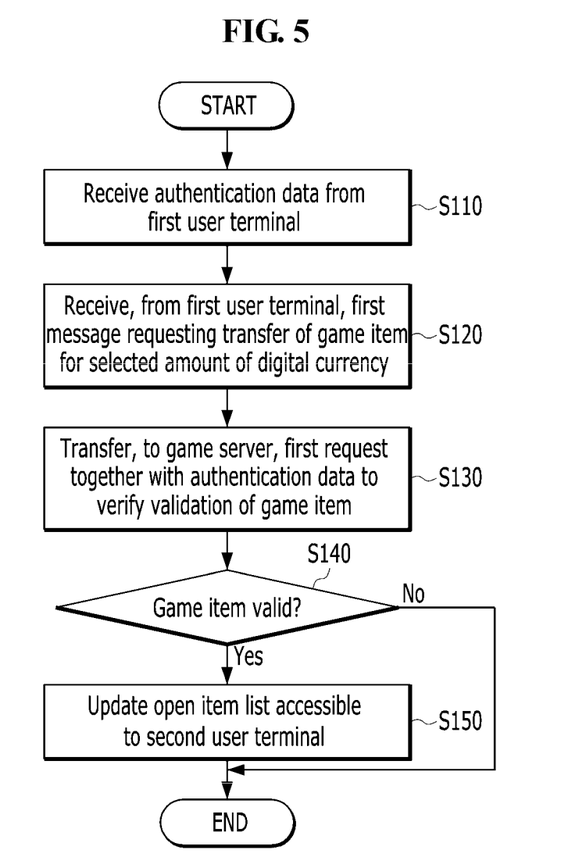
FIG. 5 is a flowchart of a method of processing a first message requesting a transfer of the game item according to an exemplary embodiment of the invention.

FIG. 5 is a flowchart of a method of processing a first message requesting a transfer of the game item according to an exemplary embodiment of the invention.

Referring to FIGS. 1 and 5, at step S110, the authentication data 114 is received from the first user terminal 120. The first user terminal 120 may access through a first user ID and provide the authentication data 114. The first user terminal 120 may transfer the authentication data 144 after sharing the authentication data 144 with the game server 110. A first game ID may be further received from the first user terminal 120. Step S110 may be performed before step S120 is performed. Alternatively, requesting the first user terminal 120 to provide the authentication data 144 may be performed when the first message of the step S120 is received but the authentication data 144 is not received.

At step S120, a first message requesting a transfer of the game item for selected amount of digital currency is received from the first user terminal 120.

At step S130, a first request is transferred together with the authentication data 144 to the game server 110 to verify a validation of the game item. Since the authentication data 144 ensures the reliability of the first request, the authentication data 144 may enable the game server 110 to access game item information belonging to the first game ID and to verify the validation of the game item. In an exemplary embodiment, the game server 110 may access its database such as the item list LST_GMID shown in FIG. 2.

At step S140, whether the game item is valid is determined based on a feedback signal or data from the first request received from the game server 110. The feedback may include information indicating the authentication data 144 is invalid. In the case where the authentication data 144 is valid, the feedback may include information indicating the game item is valid. In another exemplary embodiment, the feedback may include game item information of the first game ID. If the game item is valid, step S150 is performed.

At step S150, the open item list is updated to include the game item and the selected amount of digital currency. The open item list is accessible to the second user terminal 130.

Figure 6:
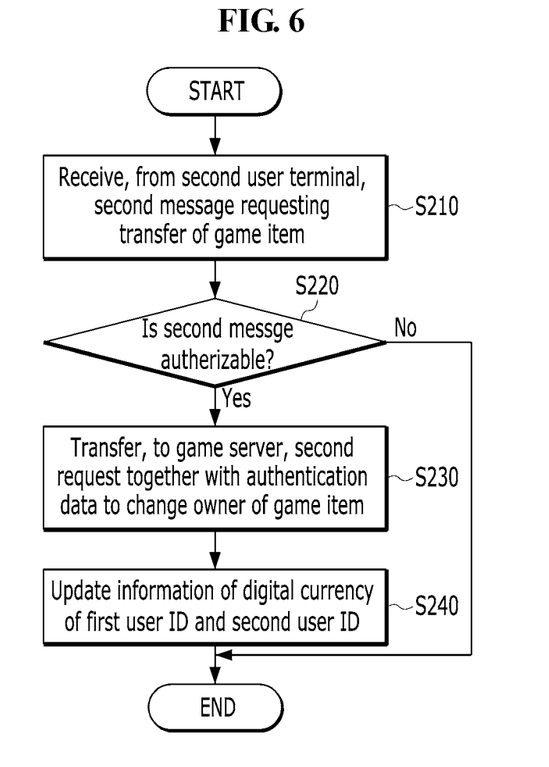
FIG. 6 is a flowchart of a method of processing a second message requesting a transfer of the game item according to an exemplary embodiment of the invention.

FIG. 6 is a flowchart of a method of processing a second message requesting a transfer of the game item according to an exemplary embodiment of the invention.

Referring to FIGS. 1 and 6, at step S210, a second message requesting a transfer of the game item listed in the open item list is received from the second user terminal 130. The second user terminal 130 may access through a second user ID and transfer the second message in response to an input from the user. A second game ID may be further received from the second user terminal 130.

At step S220, whether the second message is authorizable is determined. For instance, whether the second message is authorizable is determined by accessing the database 150 to determine whether at least the selected amount of digital currency belongs to the second user ID.

At step S230, a second request to change the owner of the game item from the first game ID to the second game ID is transferred together with the authentication data 144 to the game server 110 in response to determining that the second message is authorizable. The first and second game IDs may also be transferred to the game server 110. Since the authentication data 144 ensures the reliability of the second request, the authentication data 144 may enable the game server 110 to change the owner of the game item. The game server 110 may update the item list LST_GMID for the first game ID and the item list LST_GMID for the second game ID.

At step S240, the digital currency of the first and second user IDs are updated.

A method according to exemplary embodiments of the invention facilitates the exchange of game items by communicating with the game server 110 instead of the user terminals 120 and 130. Accordingly, the network traffic and resources required when the user terminals 120 and 130 access the game server 110 and trade the game item themselves may be reduced. Thus, overall networking performance of the network system 100 may also be improved. Furthermore, convenience of game users may further be improved.

A method according to exemplary embodiments of the invention transfers the authentication data 144 to the game server 110 when transferring the requests associated with the exchange of the game items. Accordingly, the reliability of the requests may be improved, thereby improving the exchange efficiency.

Figure 7:
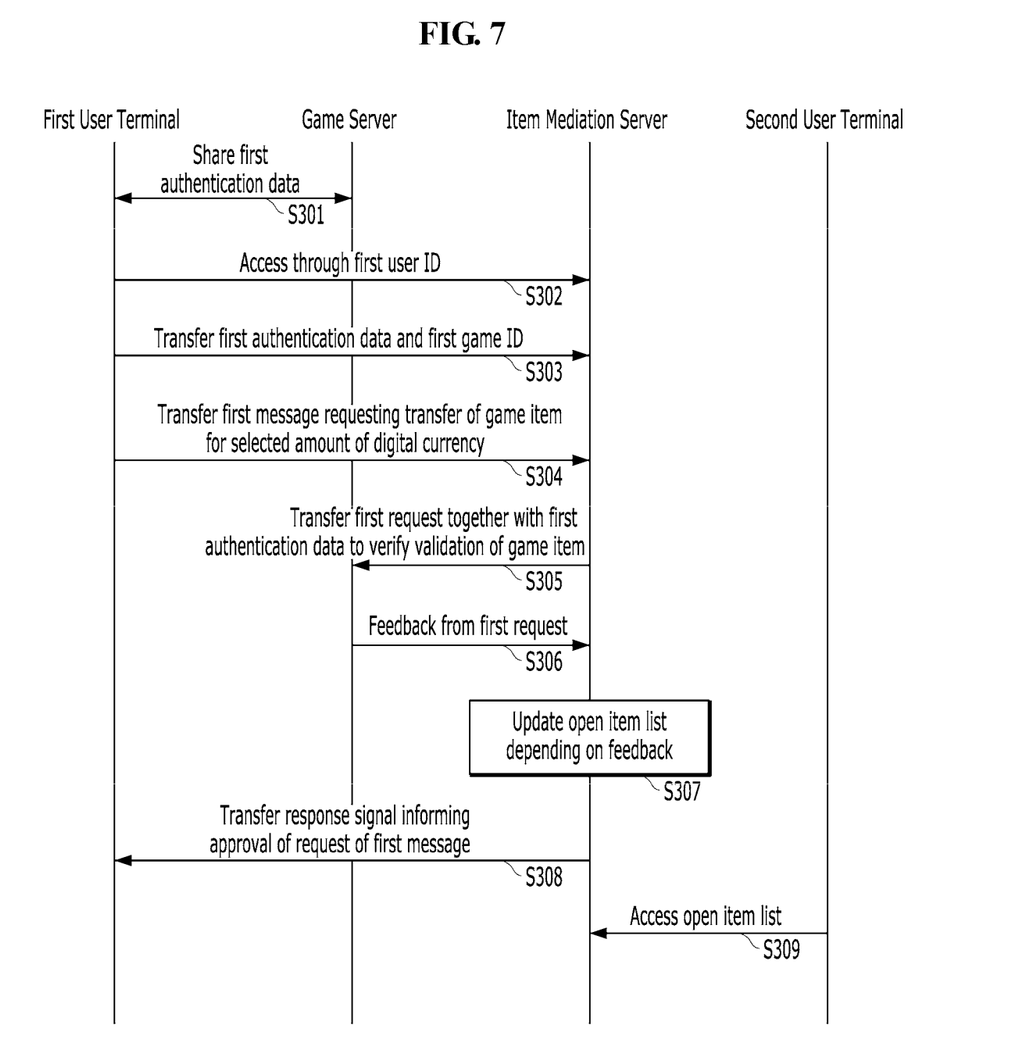
FIG. 7 is a flowchart of an exemplary embodiment of a method of processing the first message requesting the transfer of the game item.

FIG. 7 is a flowchart of an exemplary embodiment of a method of processing the first message requesting the transfer of the game item.

Referring to FIG. 7, at step S301, the first user terminal 120 and the game server 110 share first authentication data. The first user terminal 120 may access the game server 110 through the first game ID and carry out actions required by the game service, and may share the first authentication data with the game server 110 while accessing the game server 110. The first authentication data is determined in the same manner as described with reference to the authentication data 144 of FIG. 1.

At step S302, the first user terminal 120 accesses the item mediation server 140 through the first user ID. At step S303, the first user terminal 120 transfers the first authentication data and the first game ID to the item mediation server 140. For instance, the first user terminal 120 may transfer the first authentication data in response to a user input agreeing to transfer the first authentication data to an external device such as the item mediation server 140. The item mediation server 140 may store the first authentication data as described with reference to FIG. 1.

At step S304, the first user terminal 120 transfers, to the item mediation server 140, a first message requesting the transfer of the game item for the selected amount of digital currency. For example, the first user terminal 120 may provide a user interface for receiving a user input selecting the game item and an amount of digital currency.

At step S305, the item mediation server 140 transfers, to the game server 110, a first request together with the first authentication data to verify a validation of the game item. The mediation server 140 may further transfer the first game ID to the game server 110.

At step S306, the game server 110 transfers a feedback signal or data from the first request to the item mediation server 140. The game server 110 may determine whether the first authentication data is the one shared with the first user terminal 120. If so, the game server 110 may access game item information belonging to the first game ID, and may verify whether the first game ID has the requested game item. The game server 110 may verify the validation of the game item by determining whether the identification number of the game item exists in its database. Depending on the verification, the game server 110 may transfer the feedback to the user terminal 120 indicating whether the game item is valid or invalid. If the first authentication data is not the one shared with the first user terminal 120, the game server 110 may transfer the feedback indicating that the first authentication data is invalid.

At step S307, the item mediation server 140 updates the open item list to include the game item and the selected amount or more of digital currency when the game item is determined to be valid depending on the feedback received from the game server 110. The game server 110 may manage the game item as an item to be exchanged. For example, the game server 110 may inform the first user terminal 120 that the game item is the item to be exchanges when the first user terminal 120 accesses the game server 110. For example, the game server 110 may withdraw the game item from the item list LST_GMID (shown in FIG. 2) of the first game ID in advance.

At step S308, the item mediation server 140 transfers, to the first user terminal 120, a response signal informing an approval of the request of the first message. Based on the received response signal, the first user terminal 120 may display that the request of the first message is approved so that the user of the first user terminal 120 may recognize the game item registered in the open item list.

At step S309, the second user terminal 130 accesses the open item list of the item mediation server 140. That is, the open item list of the item mediation server 140 is accessible by user terminals able to communicate with the item mediation server 140.

Figure 8:
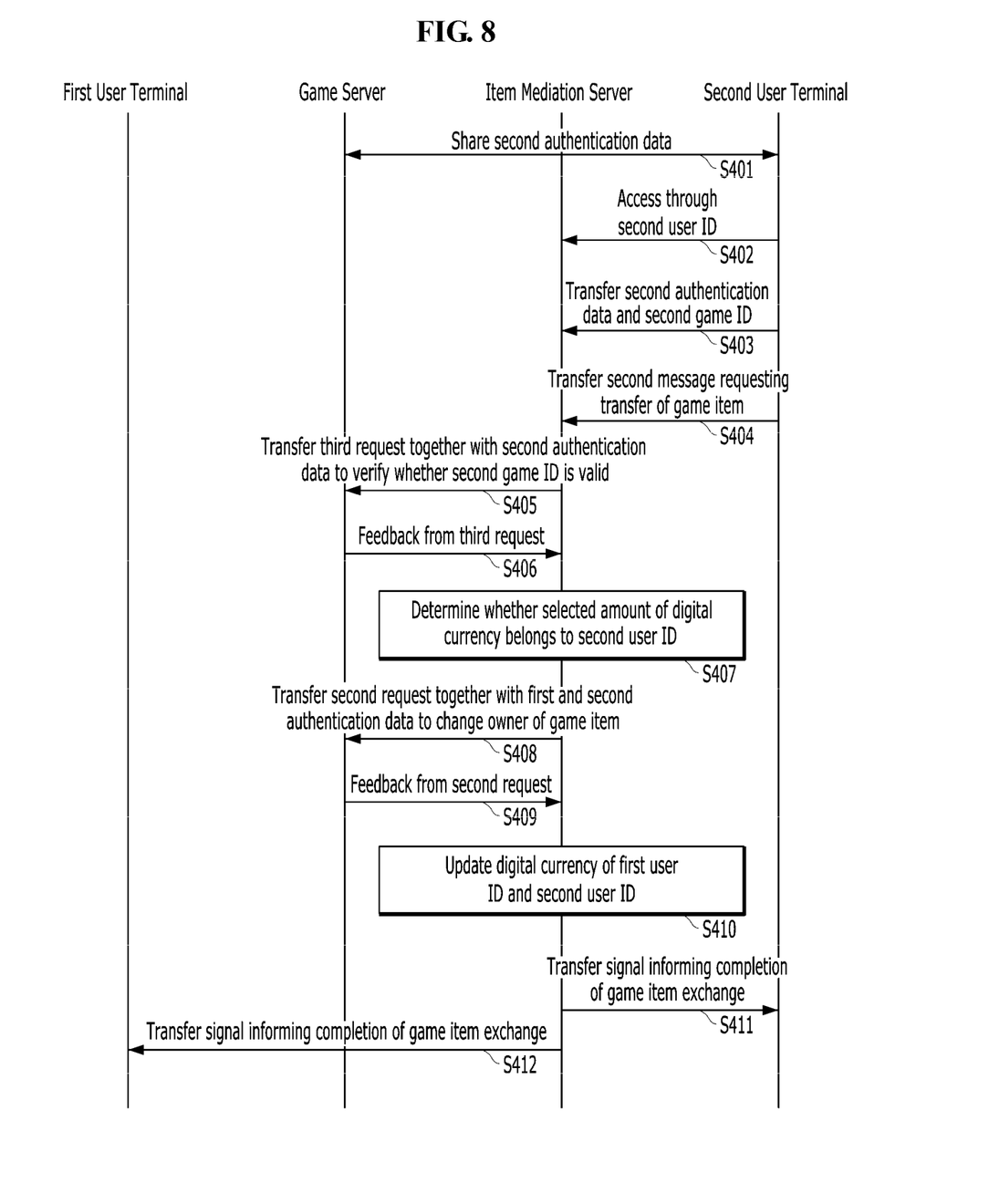
FIG. 8 is a flowchart of an exemplary embodiment of a method of processing the second message requesting the transfer of the game item.

FIG. 8 is a flowchart of an exemplary embodiment of a method of processing the second message requesting the transfer of the game item.

Referring to FIG. 8, at step S401, the second user terminal 130 and the game server 110 share second authentication data. The second user terminal 130 may access the game server 110 through the second game ID and carry out actions required by the game service, and may share the second authentication data with the game server 110 while accessing the game server 110. The second authentication data is determined in the same manner as described with reference to the authentication data 144 of FIG. 1.

At step S402, the second user terminal 130 accesses the item mediation server 140 through the second user ID. At step S403, the second user terminal 130 transfers the second authentication data and the second game ID to the item mediation server 140 in response to, for example, a user input agreeing to transfer the second authentication data to an external device such as the item mediation server 140.

At step S404, the second user terminal 130 transfers, to the item mediation server 140, a second message requesting the transfer of the game item at the selected amount or more of digital currency. For example, the second user terminal 130 may provide a user interface for receiving a user input selecting the game item listed in the open item list while displaying the open item list received from the item mediation server 140. The second user terminal 130 may communicate with the item mediation server 140 to receive digital currency information of the second user ID and may further display the amount of digital currency belonging to the second user ID.

The item mediation server 140 determines whether the second message is authorizable through suitable processes such as steps S405 to S407. If the second game ID is invalid, the owner of the game item cannot be changed from the first game ID to the second game ID. At step S405, the item mediation server 140 transfers, to the game server 110, a third request together with the second authentication data to verify whether the second game ID is valid. If the second authentication data transferred by the item mediation server 140, it means that the third request has been authorized based on an approval or selection of the second user terminal 130, and not by unknown sources. That is, the second authentication data may ensure the reliability of the third request being transferred together with the second authentication data. The game server 110 may determine whether the second game ID exists in its database in response to the third request, and at step S406, the game server 110 transfers a feedback signal or data from the third request according to the determination. At step S407, the item mediation server 140 determines whether at least the selected amount of digital currency indicated by the open item list belongs to the second user ID. The item mediation server 140 may determine that the second message is authorizable if the second game ID is valid and the second user ID has at least the selected amount of digital currency.

At step S408, the item mediation server 140 transfers, to the game server 110, a second request together with first and second authentication data to change the owner of the game item from the first game ID to the second game ID when the second message is authorizable. That is, the item mediation server 140 may transfer the second authentication data as well as the first authentication data when transferring the second request. The second authentication data further transferred by the item mediation server 140 means that the second request is based on the approval or selection of the second user terminal 120 as well. Therefore, the second authentication data may further ensure a reliability of the second request. The game server 110 may delete the game item in the item list LST_GMID of the first game ID and add the game item to the item list LST_GMID of the second game ID.

At step S409, the game server 110 transfers a feedback signal or data from the second request to the item mediation server 140. The feedback from the second request may indicate completion of the change of the owner of the game item.

At step S410, the item mediation server 410 updates the digital currency of the first user ID and the second user ID in response to the feedback from the second request. The item mediation server 410 may update the database 150, shown in FIG. 1, to withdraw the selected amount or more of digital currency from the first user ID, and to transfer the selected amount or less of digital currency to the second user ID.

At steps S411 and S412, the item mediation server 411 transfers, to the first and second user terminals 120 and 130, signals informing completion of the exchange of the game item.

Figure 9:
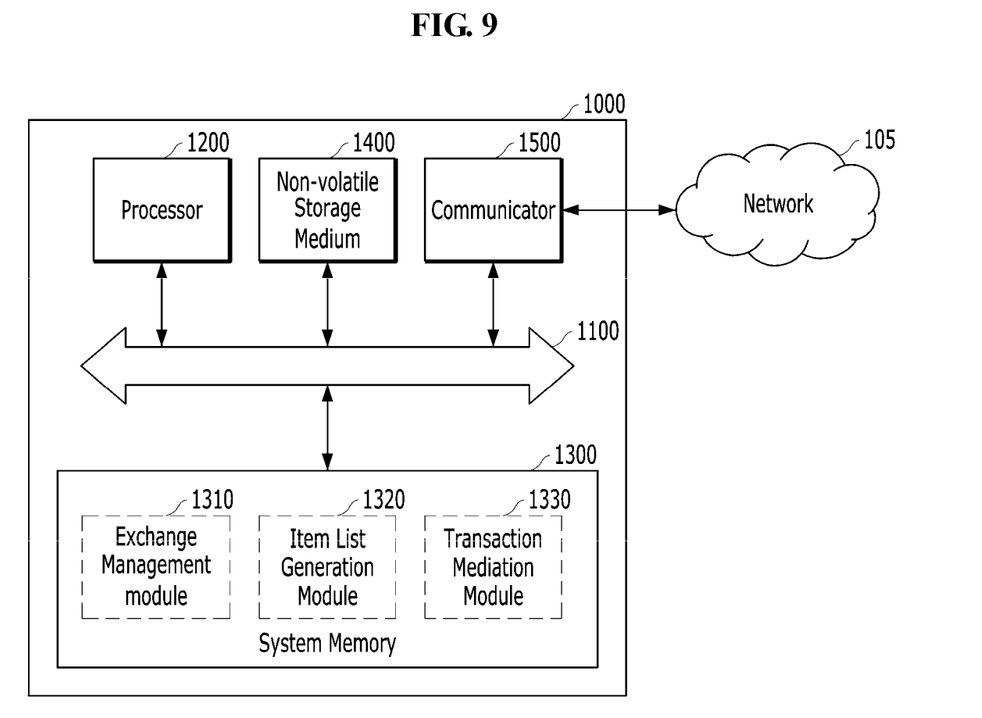
FIG. 9 is a block diagram of an exemplary computer device suitable for the item mediating server 140 shown in FIG. 1.

FIG. 9 is a block diagram of an exemplary computer device suitable for the item mediating server 140 shown in FIG. 1.

Referring to FIG. 9, a computer system 1000 may include a bus 1100, a processor 120, a system memory 1300, a non-volatile storage medium 1400, and a communicator 1500.

The bus 1100 is coupled to various elements of the computer system 1000 to transfer data, signals, and information. The processor 1200 may be a general purpose processor and/or a special purpose processor, and may be configured to control overall operations of the computer system 1000.

The processor 1200 loads computer programs and/or instructions to the system memory 1300, and may execute the loaded computer programs and/or instructions to provide various functions. For example, the system memory 1300 may be provided as a working memory of the processor 1200.

The processor 1200 may load an exchange management module 1310 providing functions of the exchange manager 141 shown in FIG. 1, an item list generation module 1320 providing functions of the item list generator 142 shown in FIG. 1, a transaction mediation module 1330 providing functions of the transaction mediator 143 shown in FIG. 1, when executed by the processor 1200. The loaded computer programs and/or instructions may be executed by the processor 1200 to perform processes described with reference to FIGS. 4, 5, 6, 7, and 8. In addition, the processor 1200 may load other computer programs and/or instructions providing one or more additional functions when executed by the processor 1200.

The system memory 1300 may include at least one of various types such as a Read Only Memory (ROM), a Static RAM (SRAM), a Dynamic RAM (DRAM), and a Synchronous DRAM (SDRAM).

The computer programs and/or instructions to be loaded to the system memory 1300 may be stored in the non-volatile storage medium 1400 which retains stored data regardless power on/off conditions. For example, the non-volatile storage 1300 includes at least one of various types such as a flash memory, a hard disk, a Read Only Memory (ROM), a Programmable ROM (PROM), an Electrically Programmable ROM (EPROM), an Electrically Erasable and Programmable ROM (EEPROM), a Phase-change RAM (PRAM), a Magnetic RAM (MRAM), a Resistive RAM (RRAM), a Ferroelectric RAM (FRAM). The computer programs and/or instructions may be loaded to the system memory 1300 from an external device through the communicator 1500.

The communicator 1500 may be a transceiver or other component capable of receiving and transferring data between the computer system 1000 and other devices in the network system 100 through the network 105. The communicator 1500 may provide a wire interface and/or wireless interface to communicate through the network 105.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A network server to mediate actions relating to online games between user terminals, the network server comprising:

a communicator;

a first storage medium;

a second storage medium to store a list of game items; and at least one processor coupled to the communicator to receive data from and transfer data to an online gaming network, the at least processor being configured to:

receive a first data signal from a first user terminal, the first data signal comprising a first authentication token that is shared by the first user terminal and a game server;

store the first authentication token in the first storage medium in associated with the first user terminal;

transfer to the game server a first request, together with the first authentication token, to verify validation of a game item when a first message including information relating to the game item is received from the first user terminal;

update the list of game items of the second storage medium to include the game item information based on feedback from the first request received from the game server and provide access to the list of game items to a second user terminal;

receive from the second user terminal a second message relating to the game item;

determine whether the second message is authorized; and transfer to the game server a second request, together with the first authentication token, to change an owner of the game item from a first game ID associated with the first user terminal to a second game ID associated to the second user terminal in response to determining whether second message is authorized.

2. The network server of claim 1, wherein the first authentication token is determined by communication between the first user terminal and the game server.

3. The network server of claim 1, wherein:

the first request comprises the first game ID and information related to or representative of the game item; and the processor is further configured to receive the first game ID from the first user terminal and to update the list of the game items in response to the feedback from the first request indicating that the game item belongs to the first game ID.

4. The network server of claim 1, wherein:

the first message further comprises information representative of a selected amount of digital currency; and the processor is further configured to update the list of game items to include the digital currency information based on the feedback from the first request.

5. The network server of claim 4, wherein the processor is further configured to determine whether the second message is authorized by accessing a database to determine whether at least the selected amount of digital currency belongs to a first user ID associated with the second user terminal.

6. The network server of claim 5, wherein the processor is further configured to update a database to withdraw the selected amount of digital currency from the first user ID, and to transfer the selected amount to a second user ID associated with the first user terminal, in response to feedback from the second request received from the game server indicating completion of the change of the owner.

7. The network server of claim 1, wherein:

the processor is further configured to receive the second game ID from the second user terminal and to determine whether the second message is authorized by transferring to the game server a third request to verify whether the second game ID is valid.

8. The network server of claim 7, wherein:

the processor is further configured to receive a second authentication token from the second user terminal that is shared by the second user terminal and the game server and to transfer the second authentication token together with the third request to enable the game server to verify whether the second game ID is valid.

9. The network server of claim 1, wherein:

the processor is further configured to receive a second authentication token from the second user terminal that is shared by the second user terminal and the game server and to transfer the second authentication token together with the second request and the first authentication token.

10. The network server of claim 1, wherein the processor is further configured to:

inform the first user terminal that the request in the first message is authorized when the list of game items is updated; and inform the first user terminal that the request in the first message is not authorized when the game item is invalid.

11. A method of operating a network server to mediate actions between user terminals relating to online games, the method comprising steps of:

receiving a first data signal from a first user terminal, the first data signal comprising a first authentication token shared by the first user terminal and a game server;

storing the first authentication token in a first storage medium in associated with the first user terminal;

transferring to the game server a first request, together with the first authentication token, to verify validation of a game item associated with the game server when a first message including information relating to the game item is received from the first user terminal;

updating a list of game items of a second storage medium to include the game item information based on feedback from the first request received from the game server;

providing access to the updated list of game items to a second user terminal;

receiving from the second user terminal a second message relating to the game item;

determining whether the second message is authorized; and transferring to the game server a second request together with the first authentication token to change an owner of the game item from a first game ID associated with the first user terminal to a second game ID associated with the second user terminal in response to determining whether the second message is authorized.

12. The method of claim 11, wherein the first authentication token is determined by communication between the first user terminal and the game server.

13. The method of claim 11, further comprising the step of receiving the first game ID from the first user terminal, and wherein the first request comprises the first game ID and the game item information, and wherein the step of updating the list of game items comprises updating the list of game items in response to the feedback from the first request indicating that the game item belongs to the first game ID.

14. The method of claim 11, wherein:
the first message further includes a selected amount of digital currency; and
the step of updating the list of game items comprises updating the list of game items to further include the selected amount of digital currency based on the feedback from the first request.

15. The method of claim 14, wherein:
the step of determining whether the second message is authorized comprises accessing a database to determine whether at least the selected amount of digital currency belongs to a first user ID associated to the second user terminal.

16. The method of claim 15, further comprising:
updating a database to withdraw at least the selected amount of digital currency from the first user ID, and to transfer the selected amount of digital currency to a second user ID associated to the first user terminal, in response to feedback from the second request received from the game server indicating completion of the change of the owner.

17. The method of claim 11, further comprising a step of:
receiving the second game ID from the second user terminal, and
wherein the step of the determining whether the second message is authorized comprises transferring to the game server a third request to verify whether the second game ID is valid.

18. The method of claim 17, further comprising a step of:
receiving a second authentication token from the second user terminal, the second authentication token being shared by the second user terminal and the game server, and
wherein the step of transferring the third request comprises transferring the second authentication token together with the third request to enable the game server to verify whether the second game ID is valid.

19. The method of claim 11, further comprising the step of:
receiving a second authentication token from the second user terminal, the second authentication token being shared by the second user terminal and the game server, and
wherein the step of transferring the second request comprises transferring the second authentication token together with the second request and the first authentication token.

20. The method of claim 11, further comprising steps of:
informing the first user terminal that the request in the first message is authorized when the list of game items is updated; and
informing the first user terminal that the request in the first message is not authorized when the game item is invalid.

* * * * *